Arthur W. Hedlund
INVENTOR.

Patented Oct. 26, 1954

2,692,483

UNITED STATES PATENT OFFICE 2,692,483

REFRIGERATION UNIT UTILIZING SOLAR ENERGY

Arthur W. Hedlund, Minneapolis, Minn.

Application January 5, 1951, Serial No. 204,665

5 Claims. (Cl. 62—119.5)

This invention pertains to new and useful improvements in refrigerating apparatus, and relates particularly to apparatus uniquely adapted to utilize solar energy for the purpose of either refrigerating or air conditioning an enclosed space.

The primary object of this invention is to utilize solar energy for the purpose of producing a refrigerating effect, and to provide an apparatus which will operate with at least as great efficiency in hot climates as in cool climates.

Another important object of this invention is to provide an apparatus of this character which will operate at optimum efficiency throughout the day, that is, an apparatus in which the relative angular movement of the sun during the day will not materially effect the efficiency of the apparatus.

Yet another important object of the present invention is to provide an apparatus of this character which will occupy a minimum of otherwise useful space, and in which the housing therefor will constitute a part of the insulation surrounding the space being refrigerated thereby.

Still another important object of the present invention is to provide an apparatus of this character which will afford an excellent heat exchange with the medium being cooled thereby.

A meritorious feature of the present invention resides in the provision of a concentrator for collecting and directing the solar energy striking the same to the generator, which will operate at optimum efficiency irrespective of the declination of the sun or the hour of the day.

Another important feature of the present invention resides in the positioning of the apparatus almost entirely within a wall enclosing the refrigerated space, so as to constitute a portion of the insulation therefor.

A final important feature of the present invention to be specifically enumerated herein resides in the positioning of the evaporator and the structure surrounding the same that is adapted to induce air circulation to afford better heat exchange by conduction, and which construction will still avoid the creation of excessive cold drafts that would be objectionable when the device is used for air conditioning in a home or office.

Figure 1:
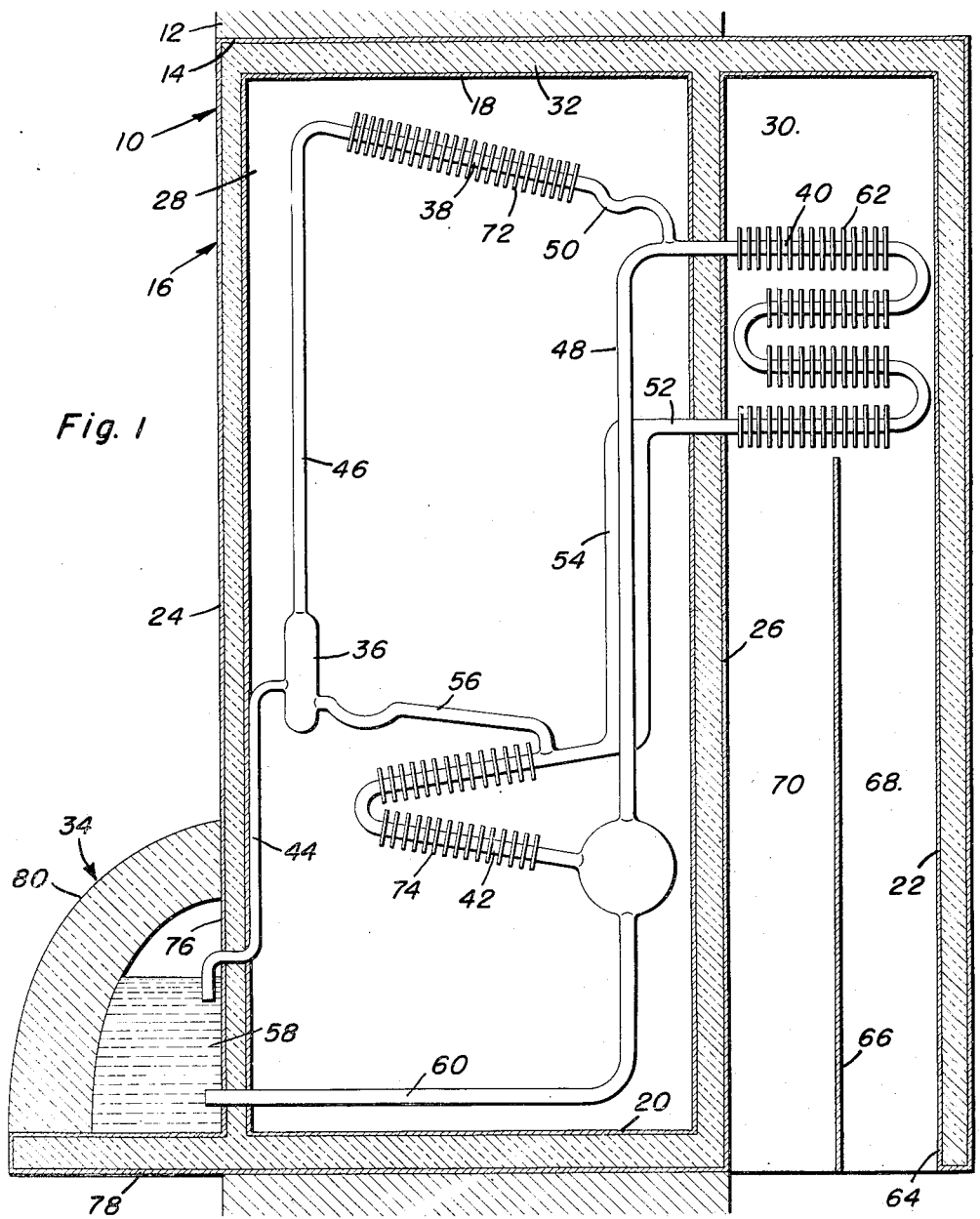
Figure 2:
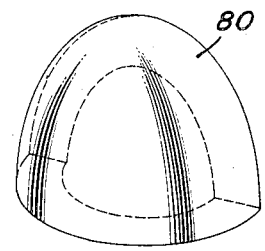

These, together with various ancillary objects and features of the invention which will become apparent as the following description proceeds, are attained by the present invention, a preferred embodiment of which has been illustrated by way of example only in the accompanying drawings, wherein:

Figure 1 is a vertical transverse sectional view of a suitable embodiment of the present invention; and Figure 2 is a perspective view of the solar energy concentrator.

Reference is now made more specifically to the accompanying drawing, wherein like numerals designate similar parts throughout the various views, and in which a wall section is designated generally at 10. It will be understood that the wall section 10 constitutes only a portion of a wall construction, not shown, built to enclose a refrigerated space that appears to the right of the wall section 10 as shown in Figure 1.

The wall section 10 includes a wall 12 having an opening 14 therethrough in which is positioned a housing designated generally at 16.

The housing 16 includes top and bottom walls 18 and 20, respectively, and inner and outer walls 22 and 24, respectively. It will be noted that the walls 22 and 24 are preferably parallel to the wall 12, and that in addition the interior of the housing 16 is provided with a partition 26 that is also parallel to the walls 22 and 24 so as to divide the interior of the housing 16 into chambers 28 and 30. In the preferred construction, the walls 18, 20, 22 and 24, as well as the partition 26 are hollow, and are filled with a suitable heat insulating material 32.

The present invention includes an absorption-type refrigeration system which includes a generator designated generally at 34, a separator 36, a condenser 38, an evaporator 40, and an absorber 42. A conduit 44 communicates between the generator 34 and the separator 36, the upper end of the latter in turn communicating with the condenser 38 through a conduit 46. The upper end of the evaporator 40 is connected to the lower end of the absorber 42 by a conduit 48 and to the discharge end of the condenser 38 by a lateral conduit 50. The lower end of the evaporator 40 communicates with the upper leg of the absorber 42 through a conduit 52, it being noted that its intermediate portion 54 of the conduit 52 surrounds a portion of the conduit 48 so as to be in heat exchange relation therewith. Finally, the absorption refrigeration circuit includes a conduit 56 which communicates between the lower end of the separator 36 and the upper leg of the absorber 42.

As will be understood, the showing of the absorption refrigeration circuit is substantially diagrammatic, and since in itself it does not constitute the claimed subject matter of the present invention, it is believed that a brief description of the operation of the same will suffice since the operation of such devices is well understood by those skilled in the art. The system is, of course, of the type operating with water, ammonia, and hydrogen, of which only a concentrated mixture, or solution of ammonia in water 58 is present in the generator 34. Upon the application of heat to the solution 58 in the generator 34, vapors consisting primarily of ammonia are driven upwards through the conduit 44 to the separator 36, where portions of the vapors which have condensed in the conduit 44 and the separator 36 drain from the separator 36 into the upper leg of the absorber 42 through the conduit 56, the uncondensed portions of the vapors (substantially pure ammonia) passing on upwardly through the conduit 46 to the condenser 38 where they are cooled sufficiently to pass into the liquid phase. The ammonia condensed in the condenser 38 then passes into the upper end of the evaporator 40 through the conduit 50 to pass downwardly therethrough where the same meets a counter-current flow of upwardly moving hydrogen, so that by virtue of the reduction of the partial pressure of the ammonia vapor in the evaporator 40 due to the presence of the hydrogen gas in the vapor phase, the ammonia evaporates to move upwardly with the hydrogen gas and then downwardly through the conduit 48 to the lower leg of the absorber 42. The mixture of ammonia vapor and the hydrogen gas then moves upwardly through the absorber 42 counter-current to the flow of water passing downwardly through the absorber 42 from the conduit 56, so that the mixture of ammonia vapor and the hydrogen gas is stripped of the ammonia due to the extreme solubility of the ammonia vapor, and the concentrated water solution of ammonia vapor passes downwardly from the lower end of the absorber 42 through the conduit 60 to return to the generator 34, the stripped hydrogen gas passing upwardly through the conduit 52 from the upper end of the absorber 42 to the lower end of the evaporator 40.

It will be noted that the entire absorption refrigeration circuit is disposed within the compartment 28 with the exception of the generator 34 and the evaporator 40, the generator 34 being disposed outside of the wall section 10, while the evaporator 40 is disposed within the compartment 30. Inasmuch as it is desired that the evaporator 40 have good heat exchange with its surroundings, the evaporator 40 is provided with a plurality of heat exchange fins 62. In order to further enhance the heat exchange of the evaporator 40 with its surroundings, the bottom of the compartment 30 is open as at 64, and a baffle 66 is disposed within the compartment 30 to extend in parallel relation with the walls 22 and 24 in spaced relation with the wall 22 and the partition 26 below the evaporator 40. The purpose of this arrangement is that warm air will rise in the space 68 between the baffle 66 and the wall 22 to pass in intimate contact with the evaporator 40 to become cooled and descend in the space 70 between the baffle 66 and the partition 26.

In order to facilitate the heat exchange of the condenser 38 with its surroundings so as to compensate for the heat of vaporization of the ammonia, the condenser 38 is provided with a plurality of heat exchange fins 72, and in a similar manner, the absorber 42 is provided with a plurality of heat exchange fins 74 in order to compensate for the heat of solution of ammonia in water. Since both the condenser 38 and the absorber 42 liberate heat within the compartment 28, the compartment 28 is vented by means, not shown, through the wall 28 to permit the escape of such liberated heat.

The generator 34 comprises a portion 76 of the wall 24 and outwardly extending portion 78 of the bottom wall 20, and a radiant energy concentrator 80. The concentrator 80 in conjunction with the wall portions 76 and 78 constitute a housing for the fluid 58, the concentrator 80 being substantially a shell that rests upon the wall portion 48 in sealing engagement with both of the wall portions 76 and 78. As best shown in Figure 2, the concentrator 80 is concavo-convex in shape, and is substantially semi-cylindrical in horizontal section throughout its vertical extent, and is substantially semi-cylindrical in vertical section taken parallel to the wall portion 76. In addition, the concentrator 80 is formed of transparent material, and is preferably of a material particularly high in transparency as to heat or infrared radiation. Further, the shape of the concentrator 80, and its index of refraction are preferably such that radiant energy emitted from any source disposed within the dihedral angle defined by the wall portions 76 and 78 striking the same will be collected and directed to the fluid 58 within the generator 34 so as to heat the fluid 58. It will be noted that both the wall portions 76 and 78 are insulated to prevent the escape of heat from the fluid 58, and in addition it is preferred that the material of which the concentrator 80 is formed be also of a material possessing low thermal conductivity to prevent the escape of heat through the concentrator 80 by conduction.

The use of the present invention will be readily appreciated. The housing 16 will be disposed in a wall 12 lying in an east-west direction with the concentrator 80 facing toward the equator, so that in temperate zones the concentrator 80 will be exposed during the hours of daylight to the radiations of the sun. Of course, when the present invention is to be utilized in the tropics, it will be preferred that two of the constructions shown in Figure 1 will preferably be employed, one of which faces towards the equator with the other facing away from the equator, so that throughout the seasons at least one of such units will be exposed to the sun's radiation.

Obviously, the apparatus will be charged with the proper quantities of water, ammonia, and hydrogen for optimum refrigerating performance, such quantities being dependent on the volumetric capacity of the entire apparatus and the relative size of the components thereof. It is contemplated that the charging of the apparatus and the installation thereof may be facilitated by an alternative construction of the same, not shown, in which a separate container will be provided for the liquid contained in the heat concentrator and placed therein, such container being provided with couplings for detachably connecting to the conduits 44 and 60.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A refrigerating apparatus comprising a wall section having a chamber therein, an absorption-type refrigerating system including a separator, a condenser, and an absorber disposed in said chamber, said system also including an evaporator coil disposed on one side of the wall section and a generator disposed on the other side of the wall section, said generator including an exposed transparent wall having optical properties adapted to collect and direct solar energy striking the same into the interior of the generator.

2. A refrigerating apparatus comprising a wall section having a chamber therein, a partition in said chamber lying substantially parallel to the plane of the wall section dividing the chamber into first and second compartments, an absorption-type refrigerating system including a separator, a condenser and an absorber disposed in the first compartment, said system also including an evaporator disposed in the second compartment and a generator disposed on the outside of the wall section on the side thereof remote from the second compartment, said wall section having an opening communicating through the bottom of the second compartment with the outside of the wall section on the side opposite the generator, a baffle in said second compartment above said opening and below the evaporator, said generator including an exposed transparent wall having optical properties adapted to collect and direct radiant solar energy striking the same into the interior of the generator.

3. A refrigerating apparatus for installation in a wall opening comprising a housing mounted in said opening and extending into the space bounded by said wall, a partition in said housing providing first and second chambers, said partition being substantially parallel to said wall, an absorption-type refrigerating system, said first chamber enclosing a condenser and an absorber of said system, said second chamber housing the evaporator of said system, the bottom of said second chamber being open, a baffle in said second chamber below said evaporator, said baffle extending substantially parallel with said partition, a bottom portion of said housing extending outwardly from said wall, a generator including a shell resting on said extending portion and in sealing relation to the outer wall of said housing, said shell enclosing a refrigerating fluid, connections between said shell and said condenser and said absorber.

4. For use in an absorption type refrigerator a solar energized generator comprising a pair of angulated walls, a concavo-convex wall sealed to said pair of walls to provide an enclosed shell, all of said walls being constructed of material having low termal conductivity, said concavo-convex wall being constituted of a material which is substantially transparent to radiant energy having a wave length of the order of infra-red, means for introducing a filling of refrigerant mixture into said shell, an outlet conduit adjacent the top of said chamber.

5. In a refrigeration apparatus of the absorption-type, a vapor generator comprising a liquid mixture container including a pair of angularly disposed walls, said walls being constructed of a material having a low thermal conductivity, a concavo-convex wall sealed in liquid-tight relation to said angularly disposed walls, said concavo-convex wall having an index of refraction such that it is substantially transparent to radiation of the order of infra-red radiation, a refrigerant mixture inlet adjacent the bottom of the space enclosed by said walls, a fluid outlet adjacent the top of said space, a refrigerating network connected between said outlet and inlet.

References Cited in the file of this patent

UNITED STATES PATENTS

| Number | Name | Date |
|---|---|---|
| 671,810 | Thurstensen | Apr. 9, 1901 |
| 751,058 | Cracknell | Feb. 2, 1904 |
| 2,030,350 | Bremser | Feb. 11, 1936 |
| 2,213,894 | Barry | Sept. 13, 1940 |
| 2,221,971 | Haywood | Nov. 19, 1940 |
| 2,230,917 | Triana | Feb. 4, 1941 |
| 2,261,682 | Hedlund | Nov. 4, 1941 |
| 2,261,683 | Kuenzli | Nov. 4, 1941 |
| 2,297,761 | Hainsworth | Oct. 6, 1942 |
| 2,342,062 | Schenck | Feb. 15, 1944 |
| 2,388,940 | Taylor | Nov. 13, 1945 |